United States Patent
Guo et al.

(10) Patent No.: US 9,585,085 B1
(45) Date of Patent: Feb. 28, 2017

(54) MANAGING NETWORK DATA CONSUMPTION OF APPLICATIONS ON CELLULAR COMPUTER NETWORKS ON ONE OR MORE CLIENT COMPUTERS

(71) Applicant: LotusFlare, Inc., Sunnyvale, CA (US)

(72) Inventors: Qing Guo, Mountain View, CA (US); Shao Xia, Fremont, CA (US); Guogang Li, San Jose, CA (US); Kunal Gulati, Castro Valley, CA (US); Zhihui Chen, San Jose, CA (US)

(73) Assignee: LotusFlare, Inc., Sunnyvale, CA (US)

( * ) Notice: Subject to any disclaimer, the term of this patent is extended or adjusted under 35 U.S.C. 154(b) by 0 days.

(21) Appl. No.: 15/174,501

(22) Filed: Jun. 6, 2016

(51) Int. Cl.
| | |
|---|---|
| *H04M 11/00* | (2006.01) |
| *H04W 48/14* | (2009.01) |
| *H04L 12/26* | (2006.01) |
| *H04L 12/14* | (2006.01) |
| *H04L 12/46* | (2006.01) |
| *H04W 84/04* | (2009.01) |
| *H04W 88/02* | (2009.01) |

(52) U.S. Cl.
CPC ......... *H04W 48/14* (2013.01); *H04L 12/1435* (2013.01); *H04L 12/4641* (2013.01); *H04L 43/0876* (2013.01); *H04W 84/042* (2013.01); *H04W 88/02* (2013.01)

(58) Field of Classification Search
CPC .................................................... H04W 48/14
See application file for complete search history.

(56) References Cited

U.S. PATENT DOCUMENTS

| 9,232,012 B1* | 1/2016 | Roberge | H04L 67/2814 |
| 2015/0201322 A1* | 7/2015 | Kim | H04W 28/16 |
| | | | 455/432.1 |

* cited by examiner

*Primary Examiner* — Justin Lee
(74) *Attorney, Agent, or Firm* — Hickman Palermo Becker Bingham LLP

(57) ABSTRACT

Computer systems and methods for managing network data consumption between a client computer and one or more server computers. A computer system comprising: a memory persistently storing a set of instructions; one or more processors coupled to the memory, wherein the one or more processors execute the set of instructions, which causes the one or more processors to: intercept, at a client computer, a first request to a first server computer from a first application being executed on the client computer before the client computer sends the first request to the first server computer; determine whether the first request should be monitored based on data associated with the first application; in response to determining that the first request should be monitored, redirect the first request to a second server computer that is different than the first server computer, and include one or more parameters that identify the first application and the first server computer.

28 Claims, 4 Drawing Sheets

MANAGING NETWORK DATA CONSUMPTION OF APPLICATIONS ON CELLULAR COMPUTER NETWORKS ON ONE OR MORE CLIENT COMPUTERS

FIELD OF THE DISCLOSURE

The present disclosure generally relates to managing network data consumption between a client computer and one or more server computers, and more specifically to monitoring or limiting network data sent or received ("consumed") by one or more particular applications on a client computer, such as a cellular phone, over a particular computer network, such as a cellular internet service provider. SUGGESTED GROUP ART UNIT: 2447; SUGGESTED CLASSIFICATION: 709; ELECTRICAL COMPUTERS AND DIGITAL PROCESSING SYSTEMS: MULTICOMPUTER DATA TRANSFERRING.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many cellular service providers, also referred to herein as "operators", limit the amount of data a user's computer, such as a mobile phone, can use over the operators computer network for a particular amount of money during a particular period of time. For example, an operator may offer a data plan that allows a user to send or receive up to 4 gigabytes of data using the user's mobile phone over the operator's network for a particular 30 day period.

Unfortunately, a user may not have control over how their computer uses the data allocated to them by the user's purchased plan from an operator. For example, the user's computer may execute system processes or applications that run in the background and request or receive data over the operator's network without the user knowing. Even if the user knows an application is sending and receiving data over the operator's computer network, the user may not know how much data is consumed by one or more applications over the operator's computer network over a particular period of time.

A user may wish to limit the total amount of data consumed by the user's phone, over the operator's network, to the amount of data periodically allocated to the user by the user's data plan. Furthermore, a user may wish to allocate a particular amount of data, per period, to a particular application. For example, a user may wish to limit the amount of data that a media streaming application uses within a particular month.

An application provider may wish to encourage a user to use an application while the user's computer is connect to the Internet over an operator's computer network. For example, a business may deploy a mobile application for their employees to use on their personal mobile phones. However, an employee may try to limit use of the application on the employee's mobile phone because the employee does not know how much data the application has or will use over the employee's operator network, the employee cannot limit the amount of data used by the application, and the employee cannot find out how much the data the application has used over a particular period. Methods for monitoring and limiting data consumed by one or more applications on a client computer of one or more particular computer networks may be valuable.

SUMMARY

The appended claims may serve as a summary of the invention.

Figure 1:
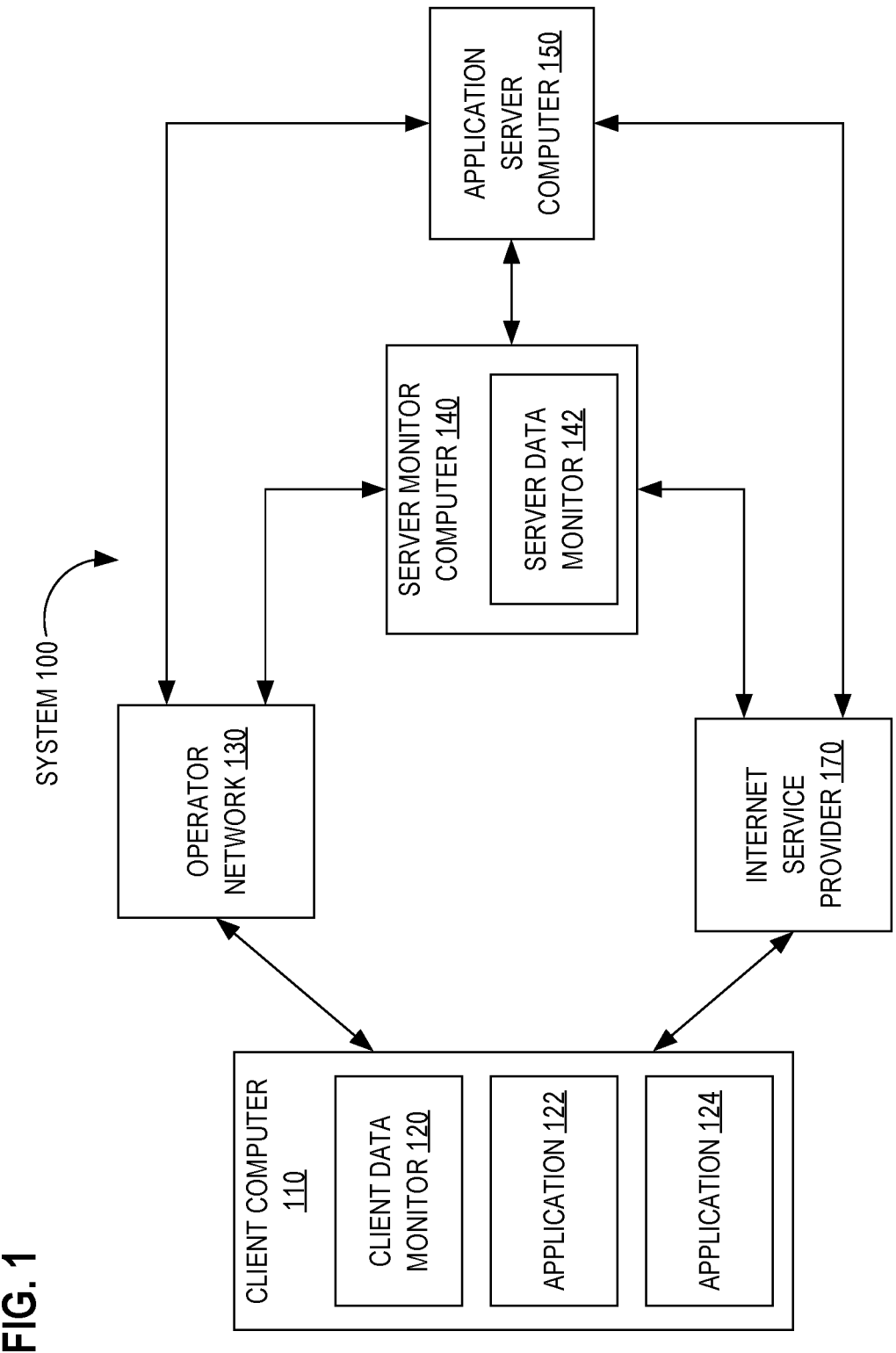
FIG. 1 illustrates a client computer that monitors or limits data sent through an intermediary computer that monitors and limits data sent to one or more application servers in an example embodiment.
Figure 2:
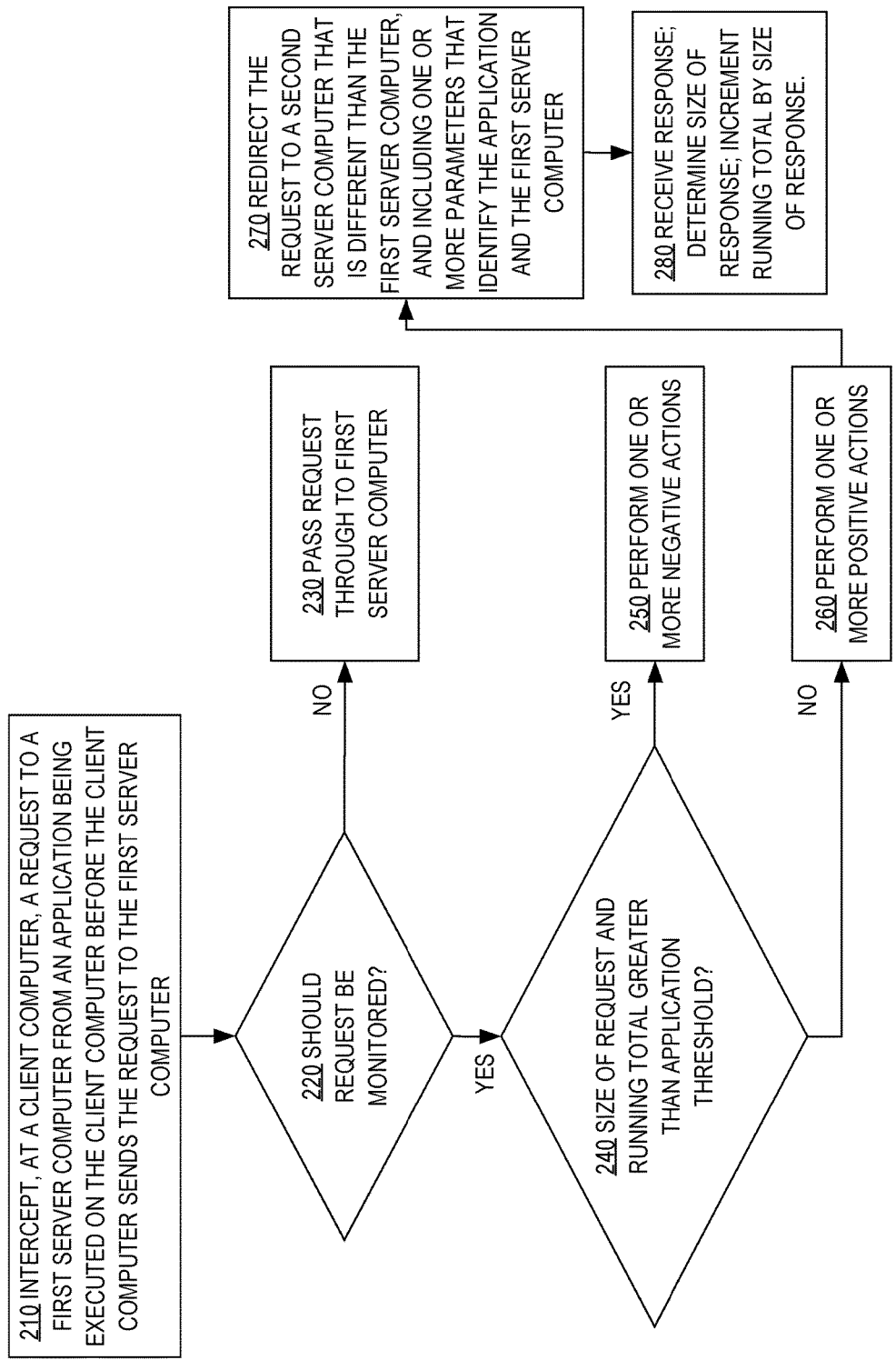
FIG. 2 illustrates a process for a client computer to monitor and limit the amount of data consumed per application over one or more computer networks, in an example embodiment.
Figure 3:
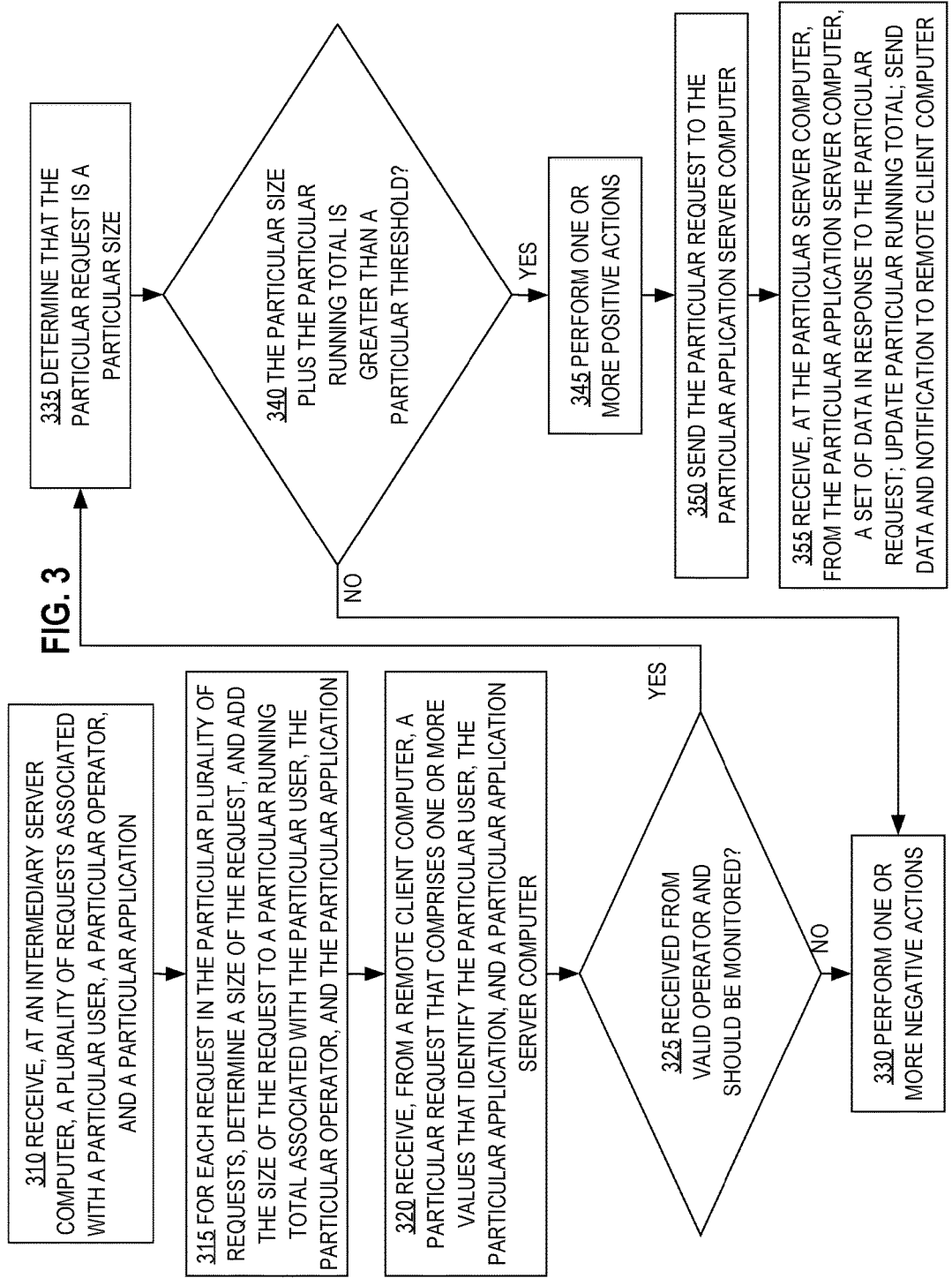
FIG. 3 illustrates a process for an intermediary computer to monitor and limit the amount of data consumed by one or more client computers over one or more operator networks per user, operator, or application, in an example embodiment.
Figure 4:
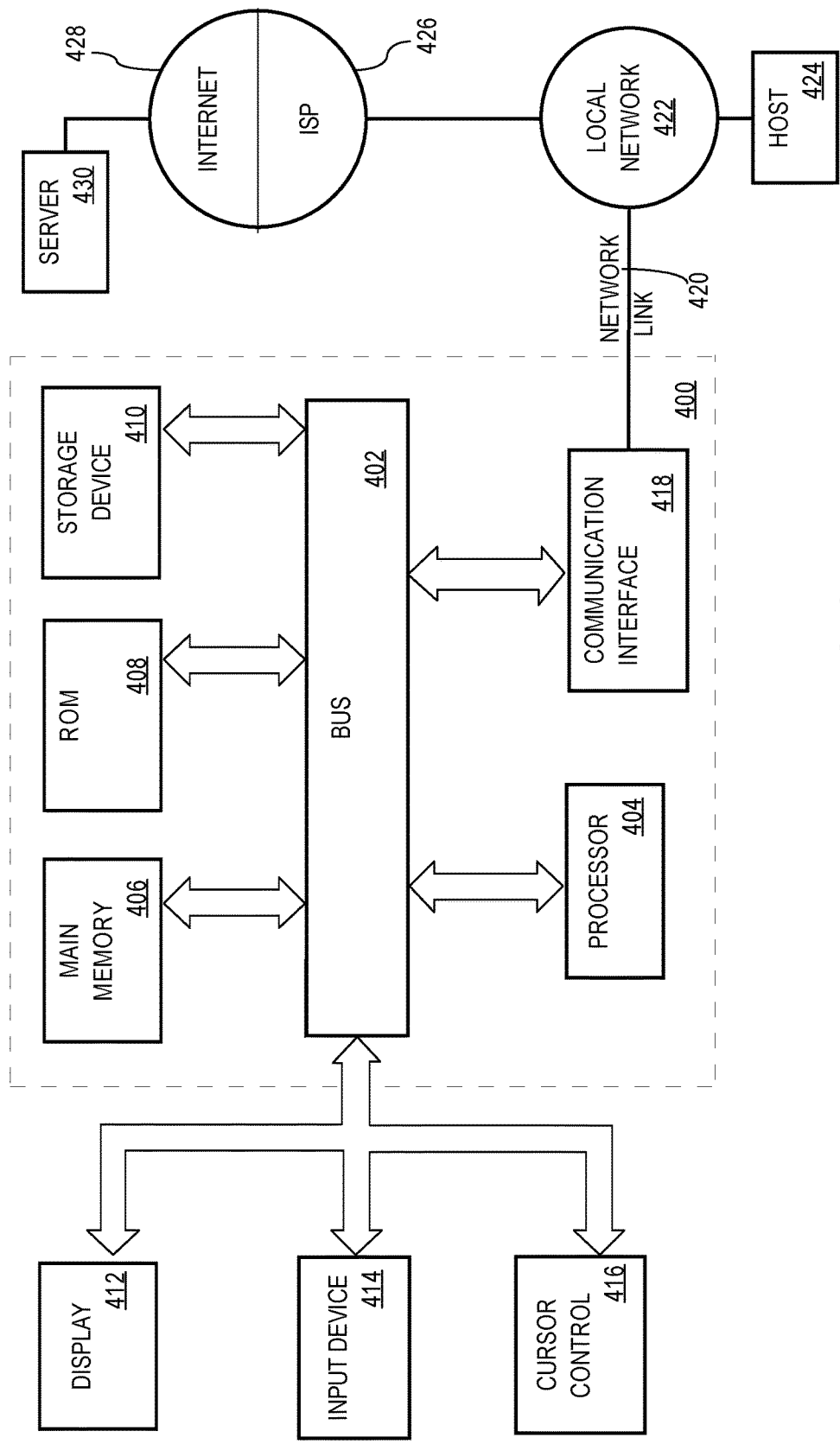
FIG. 4 is a block diagram that illustrates a computer system upon which an embodiment of the invention may be implemented.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, server monitor computer 140 in FIG. 1 may be described with reference to several steps in FIG. 2 and FIG. 3 as discussed in detail below, but using the particular arrangement illustrated in FIG. 1, 2, or 3 is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Furthermore, words, such as "or" may be inclusive or exclusive unless expressly stated otherwise.

Embodiments are described herein according to the following outline:
 1.0 General Overview
 2.0 Example Network Topology
  2.1 Client Data Monitor
   2.1.1 VPN Services
   2.1.2 Overloading Networking Interfaces
   2.1.3 Callback Registration
   2.1.4 Determining the Source Application that Issued a Request
  2.2 Internet Service Providers
  2.3 Application Server Computer
  2.4 Server Monitor Computer 3.0 Tracking and Limiting Data Consumption on a Client Computer over one or more Particular Networks
   3.1 Process for a Client Computer to Track and Limit the Amount Of Data Sent to one or more Applications Servers per Application
      3.1.1 Determining whether a Request Should be Monitored
      3.1.2 Performing one or more Negative Actions
      3.1.3 Performing one or more Positive Actions
      3.1.4 Redirecting Requests to an Intermediary Computer that Monitors and Limits Data Consumption
   3.2 Process for a Server Computer to Track and Limit the Amount of Data Sent to one or more Applications Servers per Application
      3.2.1 Determining whether a Request from a Legitimate User and Operator
      3.2.2 Negative Actions that may be Performed by an Intermediary Computer
      3.2.3 Forwarding a Request to the Original Server Computer
      3.2.4 Receive a Response to a Request, Update Running Total, and Respond Negatively if Needed
4.0 Implementation Mechanisms—Hardware Overview
5.0 Other Aspects of Disclosure

1.0 GENERAL OVERVIEW

The present invention generally relates to visualizing and configuring one or more internetworking services provided by a computer network rather than changing settings on one or more the computers in the network individually to cause the one or more computers to provide the one or more internetworking services.

In an embodiment, a computer system comprises: a memory persistently storing a set of instructions; one or more processors coupled to the memory, wherein the one or more processors execute the set of instructions, which causes the one or more processors to: intercept, at a client computer, a first request to a first server computer from a first application being executed on the client computer before the client computer sends the first request to the first server computer; determine whether the first request should be monitored based on data associated with the first application; in response to determining that the first request should be monitored, redirect the first request to a second server computer that is different than the first server computer, and include one or more parameters that identify the first application and the first server computer.

In an embodiment, the set of instructions cause the one or more processors to determine a first size, wherein the first size is a size of the first request; increment a first running total associated with the first application by the first size; intercept, at the client computer, a second request from the first application being executed on the client computer before the client computer sends the second request to the first server computer; in response to determining that the second request should be monitored: determine a second size, wherein the second size is a size of the second request; determine whether the first running total plus the second size is greater than a threshold associated with the first application.

In an embodiment, the set of instructions cause the one or more processors to, in response to determining that the first running total plus the second size is greater than the threshold associated with the first application, block the second request without sending the second request over a cellular computer network.

In an embodiment, the set of instructions cause the one or more processors to: intercept, at the client computer, a third request from a second application being executed on the client computer before the client computer sends the third request to a third server computer; determine that the third request should be monitored based on data associated with the second application; determine that the third request is a third size; determine that a second running total associated with the second application; determine that the second running total plus the third size is less than a threshold associated with the first application, and in response, redirect the third request to the second server computer.

In an embodiment, the set of instructions cause the one or more processors to, in response to determining that the first running total plus the second size is less than the threshold associated with the first application, send the second request over a cellular network to the second server computer and update the first running total to equal the first running total plus the second size.

In an embodiment, the set of instructions cause the one or more processors to: determine a first size, wherein the first size is a size of the first request; increment a first running total associated with the first application by the first size; receive a response from the second server computer in response to the first request; determine that the response is a second size; increment the first running total by the second size.

In an embodiment, the set of instructions cause the one or more processors to determine that the first application sent the first request.

In an embodiment, a method comprises: intercepting, at a client computer, a first request to a first server computer from a first application being executed on the client computer before the client computer sends the first request to the first server computer; determining whether the first request should be monitored based on data associated with the first application; in response to determining that the first request should be monitored, redirecting the first request to a second server computer that is different than the first server computer, and including one or more parameters that identify the first application and the first server computer.

In an embodiment, a computer system comprises: a memory persistently storing a set of instructions; one or more processors coupled to the memory, wherein the one or more processors execute the set of instructions, which causes the one or more processors to: receive, at an intermediary server computer, a first plurality of requests associated with a first user, a first operator, and a first application; and for each request in the first plurality of requests, determine a size of the request, and add the size of the request to a first running total associated with the first user, the first operator, and the first application; receive, from a remote client computer, at the intermediary server computer, a first request that comprises one or more values that identify the first user, the first application, a first application server computer; determine that the first request is associated with the first operator; determine that the first request is a first size; and determine whether the first size plus the first running total is greater than a first threshold associated with the first user, the first operator, and the first application; in response to determining that the first size plus the first running total is not greater than the first threshold: increment the first running total associated with the first user, the first operator, and the first application by the first size; send the first request to the first application server computer.

In an embodiment, the set of instructions cause the one or more processors to: receive, at the intermediary server computer, from the first application server computer, a set of data in response to the first request; determine that the set of data is a second size; determine that the second size plus the first running total is greater than the first threshold; increment the first running total to be equal to the first threshold; send, to the remote client computer, a limit notification indicating the first running total associated with the first user, the first operator, and the first application has reached the first threshold; send the set of data to the remote client computer.

In an embodiment, the set of instructions cause the one or more processors to, in response to determining that the first size plus the first running total is greater than the first threshold: increment the first running total to be equal to the first threshold; send, to the remote client computer, a limit notification indicating the first running total associated with the first user, the first operator, and the first application has reached the first threshold and a manager of the intermediary server computer will not further pay the first operator for any additional amount of data used by the first user using the first application through the first operator; send the first request to the first application server computer.

In an embodiment, the set of instructions cause the one or more processors to pay the first operator for a first amount of data represented by the first running total.

In an embodiment, the set of instructions cause the one or more processors to: receive, at the intermediary server computer, a second plurality of requests associated with a second user, a second operator, and a second application; and for each request in the second plurality of requests, determine a size of the request, and add the size of the request to a second running total associated with the second user, the second operator, and the second application; wherein the first running total is different from the second running total; receive, at the intermediary server computer, a second request that comprises one or more values that identify the second user, the second application, a second application server computer; determine that the second request is associated with the second operator; determine that the second request is a second size; and determine whether the second size plus the second running total is greater than a second threshold associated with the second user, the second operator, and the second application; in response to determining that the second size plus the second running total is greater than the second threshold: increment the second running total associated with the second user, the second operator, and the second application by the second size; send the second request to the second application server computer; pay the second operator for a second amount of data represented by the second running total.

In an embodiment, a method comprises: receiving, at an intermediary server computer, a first plurality of requests associated with a first user, a first operator, and a first application; and for each request in the first plurality of requests, determining a size of the request, and adding the size of the request to a first running total associated with the first user, the first operator, and the first application; receiving, from a remote client computer, at the intermediary server computer, a first request that comprises one or more values that identify the first user, the first application, a first application server computer; determining that the first request is associated with the first operator; determining that the first request is a first size; and determining whether the first size plus the first running total is greater than a first threshold associated with the first user, the first operator, and the first application; in response to determining that the first size plus the first running total is not greater than the first threshold: incrementing the first running total associated with the first user, the first operator, and the first application by the first size; sending the first request to the first application server computer; wherein the method is performed by one or more processors.

A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

A server computer may be a computer that receives requests for data and responds with data. For example, a web server computer may be an HTTP-based computer that receives HTTP requests and responds with data comprising HTML or JavaScript instructions.

2.0 EXAMPLE NETWORK TOPOLOGY

The systems and methods discussed herein improve the ability of the computer to manage the amount of data sent or received, referred to herein as "consumed", per application, per user, and per operator. FIG. 1 illustrates a client computer that monitors or limits data sent through an intermediary computer that monitors and limits data sent to one or more application servers in an example embodiment. In FIG. 1, system 100 comprises client computer 110, operator network 130, internet service provider 170, server monitor computer 140, and application server computer 150 coupled over one or more computer networks, such as the Internet. For purposes of illustrating clear examples herein, system 100 illustrates a single client computer (client computer 110) and an application server (application server computer 150), other embodiments may include many more client computers and application server computers.

2.1 Client Computer

Client computer 110 is a computer that includes hardware capable of communicatively coupling client computer 110 to one or more server computers, such as server monitor computer 140 and application server computer 150, over different service providers. For example, client computer 110 may include a cellular radio that communicates with server monitor computer 140 or application server computer 150 through operator network 130. Client computer may also include a network card that communicates with server monitor computer 140 and application server computer 150 through a home or office wireless router (not illustrated in FIG. 1) coupled to internet service provider 170.

Client computer 110 comprises client data monitor 120, application 122, and application 124. Client data monitor 120, application 122, and application 124 may be software that is persistently executed by one or more processors, or stored in persistent storage, in client computer 110. In FIG. 1, client data monitor 120 is illustrated as a separate application from application 122 and application 124. However, in an embodiment, client data monitor 120 may be a library or module within application 122 or application 124.

2.1 Client Data Monitor

Client data monitor 120 can intercept requests from one or more applications on client computer 110, such as application 122 and application 124. In response to intercepting a request, client data monitor 120 may modify the request, redirect the request, allow the request to pass through to the originally identified recipient, or one or more operations discussed further herein. Client data monitor 120 can also receive responses to requests from one or more server computers. Client data monitor 120 can modify the data in a response, remove data, add data, or perform one or more other operations discussed further herein.

There are several ways for client data monitor 120 to intercept requests and responses from one or more applications on client computer 110. For example, client data monitor 120 can instantiate a Virtual Private Network ("VPN") service that is registered with the operating system executing on client computer 110. Additionally or alternatively, client data monitor 120 may overload one or more networking interfaces.

2.1.1 VPN Services

A VPN service may create a virtual network interface, configure addresses and routing rules, and return one or more file descriptors to an application executing on client computer 110. An application may send or receive data through the file descriptors generated by the VPN service as if the application was sending or receiving data through file descriptors generated by the underlying operating system and network interfaces. A VPN service may support one or more Internet Protocols, and accordingly, data sent or received over file descriptors generated by a VPN service may have one or more Internet Protocol ("IP") headers. Furthermore, a VPN service may add or remove values from one or more IP headers.

In an embodiment, client data monitor 120 is a separate application from application 122 and application 124. Client data monitor 120 comprises a "global" VPN service that processes all data consumed over a computer network by any application, such as application 122 or application 124, on client computer 110 while the global VPN service is being executed. Accordingly, when application 122 or application 124 make an HTTP request to application server computer 150, client data monitor 120 may intercept the HTTP request before the HTTP request is sent to application server computer 150. Client data monitor 120 may allow the request to be sent to the originally identified recipient (application server computer 150 in this example), modify the request, redirect the request to a different server computer, stop the request from being sent to the originally identified recipient, or perform one or more other operations in response to the request. Furthermore, when client computer 110 receives a response to a request made by application 122 or application 124, before the data in the response is sent to application 122 or application 224, the data is received by client data monitor 120. Client data monitor 120 may modify the data in a response, perform one or more operations discussed herein, or send the original or modified data in the response to the originally intended recipient application.

A local VPN service is similar to a global VPN service, however, a local VPN service intercepts requests and responses for a particular application rather than multiple application. For purposes of illustrating a clear example, assume client data monitor 120 is included in application 122, which when executed instantiates a local VPN service. Client data monitor 120 may intercept all requests or responses sent or received by application 122, but may not intercept all requests or responses sent or received by application 124. If application 124 includes a different instance of client data monitor 120, then the different instance of client data monitor 120 may instantiate a different local VPN service to intercept all requests or responses sent or received by application 124, but may not intercept all requests or responses sent or received by application 122.

2.1.2 Overloading Networking Interfaces

In an embodiment, client data monitor 120 may be one or more libraries or modules included in an application, which overloads one or more networking interfaces provided by the operating system on client computer 110 for the application. For purposes of illustrating a clear example, assume client data monitor 120 is included in application 122, which when executed, overloads one or more system libraries for making one or more IP requests, receiving one or more responses to the requests, or establishing file descriptors or sockets with a remote computer. Client data monitor 120 may intercept all requests or responses sent or received by application 122, but may not intercept all requests or responses sent or received by application 124. If application 124 includes a different instance of client data monitor 120, then the different instance of client data monitor 120 may intercept all requests or responses sent or received by application 124, but may not intercept all requests or responses sent or received by application 122.

2.1.3 Callback Registration

In an embodiment, client data monitor 120 is included in an application and registers one or more callbacks with the underlying operating system on client computer 110, which is called in response to any request sent by the application. For purposes of illustrating a clear example, assume client data monitor 120 is a library or module within application 122, and application 122 is configured to make an HTTP request to application server computer 150. During execution, application 122 executes client data monitor 120, which registers a callback function that the operating system on client computer 110 will call if application 122 makes request to a remote server computer. Accordingly, when application 122 makes an HTTP request to application server computer 150, before the HTTP request is sent to application server computer 150, the operating system may call the callback function and pass the HTTP request as a parameter. The callback function may allow the request to be sent to the originally identified recipient, modify the request, redirect the request, stop the request from being sent, or perform one or more other operations in response to the request as discussed further herein.

2.1.4 Determining the Source Application that Issued a Request

Client data monitor 120 or server data monitor 142 (discussed further herein) may use one or more methods to determine which application sent a request that was received by client data monitor 120 or server data monitor 142. For example, if client data monitor 120 is a local VPN service for a particular application, such as application 122, then client data monitor 120 may be programmed or configured to determine that a request that client data monitor 120 intercepts is a request from application 122.

Additionally or alternatively, client data monitor 120 may be a global VPN service executed on client computer 110. Client data monitor 120 may have access to one or more particular interfaces, such as one or more application programming interfaces, private interfaces, or system files, provided by the underlying operating system on client computer 110 that will return data indicating which application sent a request. In response to receiving a request, client data monitor 120 may call the one or more particular interfaces to determine which application sent the request. An example of one or more such interfaces is a mobile device management ("MDM") system provided by an underlying operating system. Access to such interfaces may require authorization with the underlying operating system or the creator(s) of the underlying operating system.

Additionally or alternatively, server data monitor 142 may receive data from client data monitor 120 indicating which application sent a request. Continuing with the previous example, client data monitor 120 may determine that a particular application, such as application 122, sent a request. In response, client data monitor 120 may add data in the request that identifies the particular application, which in this example is application 122. The data may identify the particular application based on an identifier used in an app store or a proprietary token shared between client data monitor 120 and server data monitor 142.

Additionally or alternatively, server data monitor 142 may determine which application sent a request based one or more factors in the request. For example, server data monitor 142 may receive a plurality of requests from a plurality of client computers. Each request may identify a particular application. Server data monitor 142 may analyze the plurality of requests and determine that the plurality of requests have one or more particular features in common and that any request with those one or more particular features are from the particular application. For purposes of illustrating a specific example, assume the following:

Server data monitor 142 receives a plurality of requests from a plurality of client computers;
Server data monitor 142 determines that each request, in a first set of requests among the plurality of requests, identifies a first application server computer, such as application server computer 150;
Server data monitor 142 determines that each request, in the first set of requests, includes data that identifies application 122;
Server data monitor 142 determines that each request, in a second set of requests among the plurality of requests, identifies a second destination server computer that is different than application server computer 150;
Server data monitor 142 determines that each request, in the second set of requests, includes data that identifies application 124.

In response to receiving a request that does not include data that identifies application 122, but does identify the first application server computer, server data monitor 142 may determine that the request is from an instance of application 122 being executed on a client computer. In response to receiving a request that does not include data that identifies application 124, but does identify the second application server computer, server data monitor 142 may determine that the request is from an instance of application 124 being executed on a client computer.

Server data monitor 142 may send data to client data monitor 120 indicating which one or more factors client data monitor may use to determine which application sent a request. Continuing with the previous example, server data monitor 142 may send data to client data monitor 120 indicating that a request for the first application server computer is from an instance of application 122 and a request to a second application server computer is from an instance of application 124. Accordingly, in response to receiving a first request and determining that the request is for the first application server computer, client data monitor 120 may determine that application 122 sent the request. In response to receiving a second request and determining that the request is for the second application server computer, client data monitor 120 may determine that the second request is from application 124.

2.2 Internet Service Providers

Operator network 130 and internet service provider 170 may each be a separate internet service provider ("ISP") through which client computer 110 may be communicatively coupled to server monitor computer 140 and application server computer 150. Operator network 130 may be an ISP through a cellular computer network that charges users based on how much data is consumed by the users' devices. Internet service provider 170 may be an ISP that does not charge users based on how much data is consumed by users' computers. For purposes of illustrating a clear example, operator network 130 is a cellular ISP, however, the systems and methods discussed herein may be used for one or more other computer networks—cellular or otherwise.

2.3 Application Server Computer

Application server computer 150 is a server computer that receives and responds to requests from applications executed on client computers, such as client computer 110. Application server computer 150 is illustrated as a single computer, but could comprise a plurality of computer communicatively coupled over one or more computer networks across one or more geographical regions. Application server computer 150 may receive and respond to requests for a particular application on one or more client computers, such as application 122 on client computer 110. Alternatively, application server computer 150 may receive and respond to requests for more than one application on one or more client computers, such as application 122 and application 124 on client computer 110.

2.4 Server Monitor Computer

Server monitor computer 140 may be an intermediary computer that is communicatively coupled with client computers and application server computers. Server monitor computer 140 is illustrated as a single computer, but could comprise a plurality of computers communicatively coupled over one or more computer networks across one or more geographical regions.

Server monitor computer 140 comprises server data monitor 142. Server data monitor 142 may be software that is persistently stored in memory in server monitor computer 140, and executable by one or more processors in server monitor computer 140. Server data monitor 142 may perform one or more of the methods discussed herein using the one or more processors. For example, server data monitor 142 may monitor, modify, and supervise data sent between client computers and application server computers as discussed further herein.

Server monitor computer 140 may be coupled to internet service provider 170, operator network 130, or application server computer 150 through one or more computer networks. For example, server monitor computer 140 may be a computer that is part of a cloud computing system coupled to internet service provider 170, operator network 130, or application server computer 150 over the Internet. Additionally or alternatively, server monitor computer 140 may be a computer that is part of operator network 130. Additionally or alternatively, server monitor computer 140 may be a computer that is part of internet server provider 170. Additionally or alternatively, server monitor computer 140 and application server computer 150 may be the same computer or part of the same computer network.

3.0 TRACKING AND LIMITING DATA CONSUMPTION ON A CLIENT COMPUTER OVER ONE OR MORE PARTICULAR NETWORKS

Processes to monitor and limit data consumed by one or more applications, on a client computer, over one or more particular networks are discussed further herein. Data consumption can be monitored and limited per application, per network, per user, or on one or more other features discussed herein.

There are many ways to monitor and limit one or more applications, over one or more networks, for one or more users. For example, client computer 110 may receive input indicating that a user selected client data monitor 120. In response, client computer 110 may launch client data monitor 120, which causes client computer 110 to present a user interface on a display coupled to client computer 110. The user interface may list each of the applications installed on client computer 110. Client data monitor 120 may receive input indicating the user selected one or more applications that should be monitored. For purposes of illustrating a clear example, assume that client data monitor 120 received input and persistently stored data indicating that application 122 should be monitored and is allowed to consume up to 10 megabits over a computer network coupled to client computer 110 using a cellular radio, which in this example is operator network 130, on or before a particular date or time. Additionally or alternatively, client data monitor 120 may send the data to server data monitor 142 on server monitor computer 140, and server data monitor 142 may store the data. The data sent to server monitor computer 140 may identify the user by an identifier that is unique to operator network 130, such as a customer number or phone number. The data sent to server monitor computer 140 may identified the application by an identifier that is unique to the application, such as the application name or serial number, or generate a new token that will represent the application. Client data monitor 120 may add the token to requests sent by application 122 over one or more particular networks, such as operator network 130, but need not include the token in requests sent over other computer networks, such as internet service provider 170.

In an embodiment, server monitor computer 140 may be a web server computer, and in response to an HTTP request, server data monitor 142 may return a web page to client computer 110 that is presented in a browser. The web page may include one or more fields in which a user may specify which applications, for which users, for which computer networks that the user would like to monitor or limit. And in response to receiving input indicated that a user selected a submit button, the browser may send the input entered by the user to server data monitor 142. For example, a business may want employees to use application 122 on their mobile phones. However application 122 may be an application that employees want to use for non-business related tasks. Accordingly, a manager at the business may enter data into the web page and send the data to the server data monitor 142 indicating that all data consumed by application 122, over one or more particular operator networks, for each of its employees, from 9:00 AM Pacific Time to 5:00 PM Pacific Time, Monday through Friday should be monitored. The data may also indicate that, for each operator network among one or more particular operator networks, the business will pay the operator for the total amount of data consumed by application 122 on the operator's computer network by the employees during the specified times. Additionally or alternatively, the data may include payment information to pre-pay for a particular amount of data to be consumed by application 122 per operator network or per user during a particular period of time. For each user and operator network, any pre-paid for data that was not consumed by application 122 during the particular period of time could be carried over to a subsequent period, or refunded based on much data pre-paid and how much data was actually consumed.

3.1 Process for a Client Computer To Track and Limit the Amount of Data Sent to One or More Applications Servers Per Application FIG. 2 illustrates a process for a client computer to monitor and limit the amount of data consumed per application over one or more computer networks, in an example embodiment. In step 210, a client computer intercepts a request to a first server computer from an application being executed on the client computer before the client computer sends the request to the first server computer. For purposes of illustrating a clear example, assume following:

Client data monitor 120 received input and persistently stored a set of data associated with application 122 indicating that data consumption by application 122 should be monitored and is allowed to consume up to 100 megabits over a computer network coupled to client computer 110 using a cellular radio, which in this example is operator network 130, during the current month;

Client data monitor 120 received input and persistently stored a set of data associated with application 124 indicating that data consumption by application 124 should not be monitored;

Client data monitor 120 has instantiated a global VPN service;

Client computer 110 is currently communicatively coupled to server monitor computer 140 and application server computer 150 through operator network 130 through a cellular radio in client computer 110;

Application 122 has issued a first request to application server computer 150;

Application 124 has issued a second request to application server computer 150.

Accordingly, client data monitor 120 intercepts the first request from application 122 and the second request from application 124. Alternatively, if client data monitor 120 was a library or module of application 122, and instantiated a local VPN service or registered a callback function with the underlying operating system, then client data monitor 120 may intercept the first request from application 122, but not the second request from application 124.

3.1.1 Determining Whether a Request Should Be Monitored

In step 220, the client computer may determine whether the request should be monitored. If not, then control may pass to step 230; otherwise, control may pass to step 240. Client data monitor 120 may determine whether a request should be monitored based on one or more criteria associated with the application that issued the request, current date or time, or one or more other features discussed herein. Continuing with the previous example, client data monitor 120, as the global VPN service, may intercept the first request from application 122 with a first application identifier that identifies application 122 before the first request is sent over operator network 130. Client data monitor 120 may also intercept the second request from application 124 with a second application identifier that identifies application 124 before the second request is sent over operator network 130. An application identifier may be returned in response to a call to a particular application programming interface provided by the underlying operating system.

In response to receiving the first request is from application 122, client data monitor 120 may determine whether the first request should be monitor based on data associated with application 122. In the current example, the data associated with application 122 indicates that data consumption by application 122 should be monitored if client computer 110 is coupled to operator network 130; accordingly, for the first request, control may pass to step 240. However, if client computer 110 had been connected to application server computer 150 through internet service provider 170 or if one or more other criteria based on one or more features discussed herein associated with application 122 were not be satisfied, then control may have passed to step 230.

In one or more of the examples herein, a running total and threshold is associated with one or more features, such as a user, application, operator or operator network, geographic location, and time of day. However, in an embodiment, a running total, and not a threshold, is associated with one or more features, such as a user, application, operator or operator network, geographic location, and time of day. Accordingly, in response to determining that a request satisfies the one or more criteria, the request is forwarded to the original intended recipient and the running total is incremented. Similarly, after receiving a response to the request, the running total is incremented by the size of the response and the response is sent to the client computer that issued the request.

In response to determining that the second request is from application 124, client data monitor 120 may determine whether the first request should be monitor based on data associated with application 124. In the current example, the data associated with application 124 indicates that data consumption by application 124 should not be monitored; accordingly, for the second request, control may pass to step 230.

In step 230, the client computer passes the request through to the first server computer. Continuing with the current example, client data monitor 120 may send the second request to application server computer 150 over operator network 130.

In step 240, the client computer determines whether the size of the request and a running total of the amount of data monitored and consumed by the application is greater than a threshold associated with the application. If so, then control may proceed to step 250 and perform a negative action; otherwise, control may proceed to step 260 and perform a positive action. Continuing with the current example, and for purposes of illustrating a clear example, assume that client data monitor 120 has monitored a plurality of requests sent and responses received by application 122, and the running total of data consumed by application 122 for the current period is 99 megabits. If the first request is greater than 1 megabit, then the running total plus the size of the first request is greater than the threshold associated with the application 122 (100 megabits); accordingly, control may pass to 250. If the first request is 1 megabit or less, then the running total plus the size of the first request is less than, or equal to, the threshold associated with the application 122 (100 megabits); accordingly, control may pass to 260.

The running total associated with an application may be reset to zero at the beginning of a new period or in response to input from a user that the user has paid for more data to be consumed by application 122, the user would like to allocate more data to be consumed by application 122, or one or more other events. Additionally or alternatively, the threshold may be modified in response to input from a user that the user has paid for more data to be consumed by application 122, the user would like to allocate more data to be consumed by application 122, or one or more other events.

In an embodiment (discussed further herein), server data monitor 142 may monitor data consumption by the application. Server data monitor 142 may send notifications to client data monitor 120 indicating whether one or more first applications are allowed to continue to consume data over one or more particular networks, and whether one or more second applications are not allowed to consume data over one or more particular networks.

3.1.2 Performing One or More Negative Actions

In step 250, the client computer may perform one or more negative actions. For example, client data monitor 120 may cause client computer 110 to present, on a display coupled to client computer 110, an error message to a user indicating that application 122 has consumed the threshold amount of data allocated to application 122. Also for example, client data monitor 120 may block the request that caused client data monitor 120 to pass to step 250. Additionally or alternatively, client data monitor 120 may perform one or more negative actions, but control may proceed to step 230, and client data monitor 120 may allow application 122 to consume data over operator network 130. Client data monitor 120 may request or receive input from a user indicating what negative actions to take in response to control passing to step 250 and whether or not client data monitor 120 should proceed to step 230.

3.1.3 Performing One or More Positive Actions

In step 260, the client computer may perform one or more positive actions. A positive action may comprise client data monitor 120 incrementing the running total associated with application 122 by the size of the first request, proceeding to step 270. Additionally or alternatively, client data monitor 120 may cause client computer 110 to present, on a display coupled to the client computer 110, a message that the request will be sent out, or that the application 122 has not consumed the limited amount of data allocated to application 122.

3.1.4 Redirecting Requests to an Intermediary Computer That Monitors and Limits Data Consumption In step 270, the client computer redirects the request to a second server computer that is different than the first server computer, and includes one or more parameters that identify the application and the first server computer. Continuing with the current example, client data monitor 120 may redirect the first request to server monitor computer 140 to monitor and limit data consumption. Client data monitor 120 may include one or more parameters in the redirected request that may help server monitor computer 140 monitor and limit data consumption, such as a phone number or other user identifier, an application identifier that identifies application 122, and the original destination of the first request, which in this example is application server computer 150. Details on how server monitor computer 140 monitors and limits data consumption is discussed further herein.

In an embodiment, in step 270, client data monitor 120 may pass the first request to application server computer 150, without redirecting the request to server monitor computer 140. However, as discussed further herein, redirecting the first request to server data monitor 142 may provide some additional features.

In step 280, the client computer receives a response, determines the size of the response, and increments the running total by the size of the response. Continuing with the current example, client data monitor 120 may receive a response from the first request from application server computer 150 through server data monitor 142, or directly from application server computer 150. Client data monitor 120 may determine the size of the response, and increment the running total associated with application 122 by the size of the response. Client data monitor 120 may return the response to application 122. In an embodiment, if the running total is now greater than the threshold associated with application 122, then control may return to step 250 and client data monitor 120 may perform one or more negative actions.

3.2 Process for a Server Computer to Track and Limit the Amount of Data Sent to One or More Applications Servers Per Application FIG. 3 illustrates a process for an intermediary computer to monitor and limit the amount of data consumed by one or more client computers over one or more operator networks per user, operator, or application, in an example embodiment. For purposes of illustrating a clear example, assume following:

- A manager at a business enters data into the web page and sends the data to the server data monitor 142 indicating that all data consumed by application 122 and application 124, over one or more particular operator networks, for each of its employees, from 9:00 AM Pacific Time to 5:00 PM Pacific Time, Monday through Friday, in a particular geographic area should be monitored;
- One of the employees is the user of client computer 110, and is identified by the phone number assigned to client computer 110;
- The one or more particular operator networks includes operator network 130;
- The data also indicates that, for each operator network among one or more particular operator networks, the business will pay the operator for the total amount of data consumed by application 122 on the operator's computer network by the employees under the specified criteria up to 100 megabits per employee, per operator, per application.
- Client data monitor 120 has instantiated a global VPN service on client computer 110;
- Client computer 110 is currently communicatively coupled to server monitor computer 140 and application server computer 150 through operator network 130;
- Application 122 has issued a first request to application server computer 150;
- Application 124 has issued a second request to application server computer 150.

Client data monitor 120 may request, from server data monitor 142, a list of one or more applications that client data monitor 120 should monitor. In response server data monitor 142 may return a list of one or more applications that include application 122. The response may also indicate under what conditions requests from the one or more applications should be monitored or limited.

In step 310, an intermediary server computer receives a plurality of requests associated with a particular user, a particular operator, and a particular application. For purposes of illustrating a clear example, assume the following:

- A first plurality of requests are from application 122 on client computer 110, over operator network 130, identified as a particular employee or user by a particular phone number;
- A second plurality of requests are from application 124 on client computer 110, over operator network 130, also identified as the first user by the particular phone number.

In step 315, for each request in the particular plurality of requests, the intermediary computer determines a size of the request, and adds the size of the request to a particular running total associated with the particular user, the particular operator, and the particular application. For example, for each request of the first plurality of requests, server data monitor 142 may determine the size of the request and add the size of the request to a first running total associated with the particular user (the user of client computer 110), operator network 130, and application 122. Server data monitor 142 may forward each request of the first plurality of requests to the originally intended server computer identified in the request. For each response received from each request of the first plurality of requests that were forwarded on, server data monitor 142 may determine the size of the response and add the size of the response to the running total associated with the particular user, operator network 130, and application 122. Server data monitor 142 may forward the response to each request to application 122 on client computer 110 through client data monitor 120.

Also for example, for each request of the second plurality of requests, server data monitor 142 may determine the size of the request and add the size of the request to a second running total associated with the particular user, operator network 130, and application 124. Server data monitor 142 may forward each request of the second plurality of requests to the originally intended server computer identified in the request. For each response received from each request of the second plurality of requests that were forwarded on, server data monitor 142 may determine the size of the response and add the size of the response to the running total associated with the particular user, operator network 130, and application 124.

In step 320, the intermediary computer receives, from a remote client computer, a particular request that comprises one or more values that identify the particular user, the particular application, and a particular application server computer. For example, application 122 may generate a new request to application server computer 150. Client data monitor 120 may intercept the request, determine that this request should be monitored, and add data to the request that identifies application 122, the current geographic location of client computer 110, and the original destination for the request, which in this example is application server computer 150. Client data monitor 120 may redirect the request to server data monitor 142.

Also for example, application 124 may generate a new request to different server computers from application server computer 150. Client data monitor 120 may intercept the request, determine that this request should be monitored, and add data to the request that identifies application 124, the current geographic location of client computer 110, and the original destination for the request, which in this example is application server computer 150. Client data monitor 120 may redirect the request to server data monitor 142.

3.2.1 Determining Whether a Request From a Legitimate User and Operator

In step 325, the intermediary computer may determine whether a request is received from a valid operator and user and should be monitored. If so, then control may pass to step 230; otherwise, control may pass to step 335.

There are many ways to determine whether the request was received from a valid user. For example, when a request is received over operator network 130, a computer in operator network 130 may add, to the request, the phone number associated with the computer that sent the request. This validates the authenticity of the user of client computer 110 by a third party—the operator. Accordingly, if a request does not include a phone number, then server data monitor 142 may determine that the request was sent by an invalid user and proceed to step 230. In the case of the first request and the second request received in step 320, the first request and the second request may include the phone number associated with client computer 110 because both requests came over operator network 130.

There are many ways to determine whether a request was received from a valid operator network. For example, server data monitor 142 may be connected to one or more operator networks, and in response to receiving the first request and the second request, server data monitor 142 may use an application programming interface provided by an operator to determine which operator is associated with the phone number in the first request and the second request. Accordingly, in this example, server data monitor 142 may receive data indicating that the phone number in the first request is associated with the operator that owns or manages operator network 130, and indicate the IP addresses that are associated with operator network 130. Since the first request and the second request were received by server data monitor 142 over operator network 130, server data monitor 142 may determine that the first request and the second request were received from a valid operator, and proceed to step 335 for each request.

Server data monitor 142 may also determine whether each request should be monitored based on one or more criteria associated with the user, operator, or application that generated or sent the request. Continuing with the current example, server data monitor 142 may determine that the geographic location identified in the first is in the particular geographic area that the data associated with the user of client computer 110, application 122, and the operator that corresponds to operator network 130 indicates should be monitored. Accordingly, for the first request, server data monitor 142 may pass to step 335; otherwise, server data monitor 142 may have passed to step 330. Also for example, server data monitor 142 may determine that the geographic location identified in the second is in the particular geographic area that the data associated with the user of client computer 110, application 124, and the operator that corresponds to operator network 130 indicates should be monitored. Accordingly, for the second request, server data monitor 142 may pass to step 335; otherwise, server data monitor 142 may have passed to step 330.

3.2.2 Negative Actions that may be Performed by an Intermediary Computer

In step 330, an intermediary computer may perform one or more negative actions discussed herein. For example, a negative action may be that the size of the request is not added to a running total associated with a user, operator, or application. Server data monitor 142 may allow the request to be forwarded to the originally identified server computer, however, the size of the response from the request need not be added to the running total associated with the user, operator, or application. Additionally or alternatively, server data monitor 142 may terminate the request without forwarding the request to the originally identified server computer. Additionally or alternatively, server data monitor 142 may notify client data monitor 120 that the request will be terminated without forwarding the request to the originally intended application server computer. Client data monitor 120 may notify the user accordingly as discussed herein. Additionally or alternatively, client data monitor 120 may resend the first request directly to the application server computer without redirecting the request to server data monitor 142.

3.2.3 Incrementing a Running Total Associated with an User, Operator, and Application In step 335, the intermediary computer determines that the particular request is a particular size. For example, server data monitor 142 may determine that the first request is a first size and the second request is a second size.

In step 340, the intermediary computer determines whether the particular size plus the particular running total is greater than a particular threshold. If not, control passes to step 230; otherwise, control passes to step 245. For purposes of illustrating a clear example, assume the following:

The first size, which is the size of the first request, is 2 megabits;

The first running total associated with the particular user, operator network 130, and application 124 is 99 megabits;

The first threshold associated with the particular user, operator network 130, and application 122 is 100 megabits;

The second size, which is the size of the second request, is 1 megabits;

The second running total associated with the particular user, operator network 130, and application 122 is 90 megabits; and The second threshold associated with the particular user, operator network 130, and application 124 is 100 megabits.

Accordingly, server data monitor 142 may determine that the first size (2 megabits) plus the first running total (99 megabits) is greater than the first threshold (100 megabits), and control passes to step 330 for the first request. However, server data monitor 142 may determine that the second size (1 megabits) plus the second running total (90 megabits) is less than, or equal to, than the second threshold (100 megabits); and passes to step 245 for the second request. In this example, the first threshold and the second threshold are the same, but the in each threshold may be different.

For the first request, server data monitor 142 may perform one or more negative actions. For example, since the first request was already sent to server data monitor 142 through operator network 130, server data monitor 142 may increment the first running total to be equal to the first threshold. Additionally or alternatively, server data monitor 142 may terminate the first request without sending the first request to application server computer 150. Additionally or alternatively, server data monitor 142 may forward the request to application server computer 150, however the response from application server computer 150 need not be added to the first running total. Additionally or alternatively, server data monitor 142 may send a notification to client data monitor 120 that application 122 has hit the first threshold. In response client data monitor 120 may cause client computer 110 to present an alert on a display indicating that the user has consumed the limited amount of data that the user's employer is paying for, for application 122. If application 122 sends another request over operator network 130, then client data monitor 120 need not monitor the request or redirect the request to server data monitor 142.

For the second request, server data monitor 142 may perform one or more positive actions, such as add the second size to the second running total, proceed to step 350, or one or more other actions discussed herein.

3.2.3 Forwarding a Request to the Original Server Computer

In step 350, the intermediary computer sends the particular request to the particular application server computer. For example, server data monitor 142 may forward the second request to application server computer 150. As discussed herein, data may have been added to the second request by client data monitor 120 or operator network 130. Server data monitor 142 may remove the data added by client data monitor 120 and operator network 130 before forwarding the second request to application server computer 150.

3.2.4 Receive a Response to a Request, Update Running Total, and Respond Negatively If Needed In step 355, the intermediary computer receives, from the particular application server computer, a set of data in response to the particular request, updates particular running total, and sends data and notification to remote client computer. For example, server data monitor 142 may receive a response from application server computer 150 in response to the second request that was forwarded to application server computer 150 in step 350. Server data monitor 142 may determine the size of the response. If the size plus the running total associated with the second request is greater than the second threshold, then server data monitor 142 may proceed to step 330 and perform one or more negative actions; otherwise, server data monitor 142 may increment the second running total by the size of the response to the second request, and send the response to application 124 through operator network 130 or client data monitor 120.

For purposes of illustrating a clear example, assume that the size of the response to the second request is 2 megabits, and the second running total is now 91 megabits. Server data monitor 142 may determine that the size of the response to the second request (2 megabits) plus the second running total (91 megabits) is less than or equal to the second threshold (100 megabits). In response, server data monitor 142 may increment the second running total by the size of the second response to the second request (2 megabits), so that the second running total is now 93 megabits. Server data monitor 142 may send the response to the second request to application 124 through operator network 130 or client data monitor 120.

Server data monitor 142 may send a notification to client data monitor 120 through operator network 130 indicating that the running total associated with the user of client computer 110, application 124, and operator network 130 is currently 93 megabits, and the threshold associated with the user of client computer 110, application 124, and operator network 130 is currently 93 megabits. Accordingly, before client data monitor 120 allows application 124 to send a new request to application server computer 150 over operator network 130, client data monitor 120 may proceed to step 240 and determine whether the size of the new request, plus the current running total associated with application 124, the operator associated with operator network 130, and the user using client computer 110 would be greater than the corresponding threshold (100 megabits) and proceed accordingly. Using one more of the systems and methods discussed herein, a client-side computer system can determine whether a request would cause a running total to exceed a corresponding threshold before the request is sent over an operator network and the user is charged for consuming that data. Furthermore, the intermediary server-side computer system can determine whether a response received from a forwarded request would cause a running total to exceed a corresponding threshold before the response is sent over an operator network and a user is charged for consuming that data.

For purposes of illustrating another clear example, assume that the size of the response to the second request is 10 megabits, and the second running total is now 91 megabits. Server data monitor 142 may determine that the size of the response to the second request (10 megabits) plus the second running total (91 megabits) is greater than the second threshold (100 megabits). In response, server data monitor 142 may send a notification to client data monitor 120 indicating that the response to the second request is too big for the current amount of data application 124 is allowed to consume. Additionally or alternatively, server data monitor 142 may send the response to application 124 through operator network 130 or client data monitor 120, increment to the second running total to the second threshold (100 megabits), or send a notification to client data monitor 120 that application 124 has consumed all of the data allocated to the user by the user's employer.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a monitor ball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, or stored in storage device 510, or other non-volatile storage for later execution.

5.0 OTHER ASPECTS OF DISCLOSURE

The foregoing may be used in various scenarios. For example, as discussed above, a company, such as a taxi company, may wish to have one or more of their drivers use one or more particular applications that tracks each driver's location on the driver's mobile device over an operator network without having the driver pay for the data used. The taxi company may have the drivers install client data monitor 120 on their mobile phones. The taxi company may also open an account with a service that hosts server data monitor 142 via a web or mobile interface with server data monitor 142. The taxi company may send data to server data monitor 142 indicating that for each of the drivers (identified by their phone numbers or other device identifier as discussed herein), when using the particular application(s), the service should track the data used by each of the employee(s). Instead of the operators billing the drivers for the data that the particular application(s) consumes on the drivers' phones, the service may have an agreement with the operator(s) that the company, through the service, will track and pay for all of the data used by the employee(s) while using the particular application(s). Accordingly, the drivers need not worry about the amount of data the particular application(s) consumes, because the operators will bill the service, and in turn the taxi company, rather than attribute the data to drivers' cellular data plans.

Another scenario may be that a user wants to allocate how much data can be used by each application. For example, the user of client computer 110 may want to buy or allocate a first amount of data for a game to consume and a second amount of data for a particular browser to consume over an operator network. Client data monitor 120 may cause client computer 110 to present, on a display, a user interface with a list of applications stored on client computer 110. Client data monitor 120 may receive user input indicating which applications, and how much data each of those applications, should be allowed to consume over an operator computer network. Client data monitor 120 may upload the data or any payment information to server data monitor 142. Accordingly, using one or more of the systems and methods discussed herein, client data monitor 120 and server data monitor 142 may limit how much data each application is allowed to consume over the operator network. In response to determining that an application has consumed the pre-paid or pre-allocated amount of data assigned to the application, client data monitor 120 may cause an alert to be presented, on a display coupled to client computer 110, indicating that the application has consumed the pre-paid or pre-allocated amount of data.

Another scenario may be that a company makes one or more particular applications, and the company may want to encourage people to use the particular application(s) more freely for a particular amount of time, or during one or more particular hours. These particular hours may be a trial period, promotional time period, or a type of "happy hour" for one or more users. The company may include client data monitor 120 in the particular application(s). The company may open an account with a service that hosts server data monitor 142 via a web or mobile interface with server data monitor 142. The company may send data to server data monitor 142 indicating that for each user of the particular application(s) the service should track the data used by each user during these particular hours. Instead, of operators charging users for the data that the particular application(s) consume on the users' devices over the operators' network, the service may have an agreement with the operators that the company, through the service, will track and pay for all of the data used by the users(s) during these particular hours. Additionally or alternatively, the company may offer these particular hours to one or more users that buy a particular subscription, good, or service.

Also for example, a user may use the systems and methods discussed herein to track how much data was used by one or more applications on the user's computer on a particular operator network. Client data monitor 120 or server data monitor 142 may monitor the data each application consumes and may send a report, or cause a report to be presented on a display coupled to client computer 110, indicating how much data was consumed by each application. Additionally or alternatively, a parent or supervisor may use the systems and methods discussed herein to specify when one or more applications on client computer 110, used by a child or subordinate, is allowed to consume data.

In an embodiment, in response to determining that an application is attempting to consume data over an operator network within these particular hours, client data monitor 120 may cause an alert to be presented, on a display coupled to client computer 110, indicating that the application is not using data that will be charged to the user's account. Additionally or alternatively, in response to determining that an application is attempting to consume data over an operator network outside of these particular hours, client data monitor 120 may cause an alert to be presented, on a display coupled to client computer 110, indicating that the application is using data that will be charged to the user's account.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
a memory persistently storing a set of instructions;
one or more processors coupled to the memory, wherein the one or more processors execute the set of instructions, which causes the one or more processors to:
intercept, at a client computer, a first request to a first server computer from a first application being executed on the client computer before the client computer sends the first request to the first server computer;
determine whether the first request should be monitored based on data associated with the first application;
in response to determining that the first request should be monitored, redirect the first request to a second server computer that is different than the first server computer, and include one or more parameters that identify the first application and the first server computer.

2. The computer system of claim 1, wherein the data associated with the first application identifies a particular computer network;
wherein determining whether the first request should be monitored based on data associated with the first application comprises determining whether the first request will be sent over the particular computer network.

3. The computer system of claim 2, wherein the particular computer network is a cellular computer network, and the first request to the second server computer is sent over the cellular computer network.

4. The computer system of claim 1, wherein the set of instructions cause the one or more processors to:
determine a first size, wherein the first size is a size of the first request;
increment a first running total associated with the first application by the first size;
receive a response from the second server computer in response to the first request;
determine that the response is a second size;
increment the first running total by the second size.

5. The computer system of claim 1 wherein determining whether the first request should be monitored is based on determining the first application is a particular application that is supposed to be monitored.

6. The computer system of claim 1, wherein the set of instructions cause the one or more processors to determine that the first application sent the first request.

7. The computer system of claim 1, wherein the set of instructions cause the one or more processors to:
instantiate a VPN service;
receive, at the VPN service, the first request, wherein the VPN service determines whether the first request should be monitored, and if so, redirects the first request to the second server computer.

8. The computer system of claim 1, wherein the set of instructions cause the one or more processors to identify, in response to intercepting the first request, the first application through one or more particular interfaces provided by an underlying operating system of the client computer.

9. The computer system of claim 1, wherein the one or more parameters that identify the first application comprise a proprietary token shared between the client computing device and the second server computer.

10. The computer system of claim 1, wherein the set of instructions cause the one or more processors to identify, in response to intercepting the first request, the first application based, at least in part, on an identification of the first server computer in the first request.

11. A computer system comprising:
a memory persistently storing a set of instructions;
one or more processors coupled to the memory, wherein the one or more processors execute the set of instructions, which causes the one or more processors to:
intercept, at a client computer, a first request to a first server computer from a first application being executed on the client computer before the client computer sends the first request to the first server computer;
determine whether the first request should be monitored based on data associated with the first application;
in response to determining that the first request should be monitored, redirect the first request to a second server computer that is different than the first server computer, and include one or more parameters that identify the first application and the first server computer;
determine a first size, wherein the first size is a size of the first request;
increment a first running total associated with the first application by the first size;
intercept, at the client computer, a second request from the first application being executed on the client computer before the client computer sends the second request to the first server computer;
in response to determining that the second request should be monitored:
determine a second size, wherein the second size is a size of the second request;
determine whether the first running total plus the second size is greater than a threshold associated with the first application.

12. The computer system of claim 11, wherein the set of instructions cause the one or more processors to, in response to determining that the first running total plus the second size is greater than the threshold associated with the first application, block the second request without sending the second request over a cellular computer network.

13. The computer system of claim 12, wherein the set of instructions cause the one or more processors to:
intercept, at the client computer, a third request from a second application being executed on the client computer before the client computer sends the third request to a third server computer;
determine that the third request should be monitored based on data associated with the second application;
determine that the third request is a third size;
determine that a second running total associated with the second application;
determine that the second running total plus the third size is less than a threshold associated with the first application, and in response, redirect the third request to the second server computer.

14. The computer system of claim 11, wherein the set of instructions cause the one or more processors to, in response to determining that the first running total plus the second size is less than the threshold associated with the first application, send the second request over a cellular network to the second server computer and update the first running total to equal the first running total plus the second size.

15. A method comprising:
intercepting, at a client computer, a first request to a first server computer from a first application being executed on the client computer before the client computer sends the first request to the first server computer;
determining whether the first request should be monitored based on data associated with the first application;
in response to determining that the first request should be monitored, redirecting the first request to a second server computer that is different than the first server computer, and including one or more parameters that identify the first application and the first server computer;
wherein the method is performed by one or more processors in the client computer.

16. The method of claim 15, wherein the data associated with the first application identifies a particular computer network;
wherein determining whether the first request should be monitored based on data associated with the first application comprises determining whether the first request will be sent over the particular computer network.

17. The method of claim 16, wherein the particular computer network is a cellular computer network, and the first request to the second server computer is sent over the cellular computer network.

18. The method of claim 15 comprising:
determining a first size, wherein the first size is a size of the first request;
incrementing a first running total associated with the first application by the first size;
intercepting, at the client computer, a second request from the first application being executed on the client computer before the client computer sends the second request to the first server computer;
in response to determining that the second request should be monitored:
determining a second size, wherein the second size is a size of the second request;
determining whether the first running total plus the second size is greater than a threshold associated with the first application.

19. The method of claim 18 comprising, in response to determining that the first running total plus the second size is greater than the threshold associated with the first application, blocking the second request without sending the second request over a cellular computer network.

20. The method of claim 19 comprising:
intercepting, at the client computer, a third request from a second application being executed on the client computer before the client computer sends the third request to a third server computer;
determining that the third request should be monitored based on data associated with the second application;
determining that the third request is a third size;
determining that a second running total associated with the second application;
determining that the second running total plus the third size is less than a threshold associated with the first application, and in response, redirecting the third request to the second server computer.

21. The method of claim 18 comprising, in response to determining that the first running total plus the second size is less than the threshold associated with the first application, sending the second request over a cellular network to the second server computer and updating the first running total to equal the first running total plus the second size.

22. The method of claim 15 comprising:
determining a first size, wherein the first size is a size of the first request;
incrementing a first running total associated with the first application by the first size;
receiving a response from the second server computer in response to the first request;
determining that the response is a second size;
incrementing the first running total by the second size.

23. The method of claim 15 wherein determining whether the first request should be monitored is based on determining the first application is a particular application that is supposed to be monitored.

24. The method of claim 15 comprising determining that the first application sent the first request.

25. The method of claim 15 comprising:
instantiating a VPN service;
receiving, at the VPN service, the first request, wherein the VPN service determines whether the first request should be monitored, and if so, redirects the first request to the second server computer.

26. The method of claim 15, further comprising:
in response to intercepting the first request, identifying the first application through one or more particular interfaces provided by an underlying operating system of the client computer.

27. The method of claim 15, wherein the one or more parameters that identify the first application comprise a proprietary token shared between the client computing device and the second server computer.

28. The method of claim 15, further comprising:
in response to intercepting the first request, identifying the first application based, at least in part, on an identification of the first server computer in the first request.

* * * * *